United States Patent [19]

Planeta

[11] Patent Number: 5,560,938
[45] Date of Patent: Oct. 1, 1996

[54] INTERNAL COOLING AIR SUPPLY ASSEMBLY

[76] Inventor: Mirek Planeta, 170 Traders Blvd., Mississauga, Ont. L4Z 1W7, Canada

[21] Appl. No.: 454,783
[22] Filed: May 31, 1995
[51] Int. Cl.⁶ .................................................. B29C 47/88
[52] U.S. Cl. .................. 425/72.1; 425/326.1; 425/387.1
[58] Field of Search ............................... 425/72.1, 326.1, 425/387.1; 264/565, 569

[56] References Cited

U.S. PATENT DOCUMENTS

| 3,898,028 | 8/1975 | Upmeier | 425/72.1 X |
| 4,080,143 | 3/1978 | Upmeier | 425/72.1 X |
| 4,105,380 | 8/1978 | Zimmermann | 425/326.1 X |
| 4,265,853 | 5/1981 | Havens | 425/72.1 X |
| 4,678,417 | 7/1987 | Upmeier | 425/326.1 X |
| 4,929,162 | 5/1990 | Planeta | 425/72.1 |
| 5,464,336 | 11/1995 | Planeta | 425/72.1 |

Primary Examiner—Richard L. Chiesa
Attorney, Agent, or Firm—Rogers & Scott

[57] ABSTRACT

An internal cooling air supply assembly is provided for supplying cooling air to the interior of an extruded tubular plastic film after the film has been extruded from an annular die at an elevated temperature. The air supply assembly has a lower annular member mountable on an annular die so as to be within extruded tubular plastic film as the film leaves the die, the die having an air supply passage to supply cooling air to the interior of the lower annular member and an air removal passage including an air removal chimney extending upwardly from the die through the lower annular member to remove air from the interior of the tubular plastic film. Intermediate and first upper annular members are positionable above the lower annular member with the air removal chimney extending upwardly therethrough. The lower, intermediate and first upper annular members form an upwardly and outwardly inclined sidewall through which first and second cooling air outlets pass, and the sidewall substantially conform in shape with and extends relatively close to the interior of the extruded plastic film as the film leaves the die. Cooling air is directed onto the interior of film from the first and second chambers through the first and second cooling air outlets respectively, the cooling air outlets being sized to cause cooling air to be directed onto the interior of the film at a greater rate from the second cooling air outlet than from the first cooling air outlet.

5 Claims, 1 Drawing Sheet

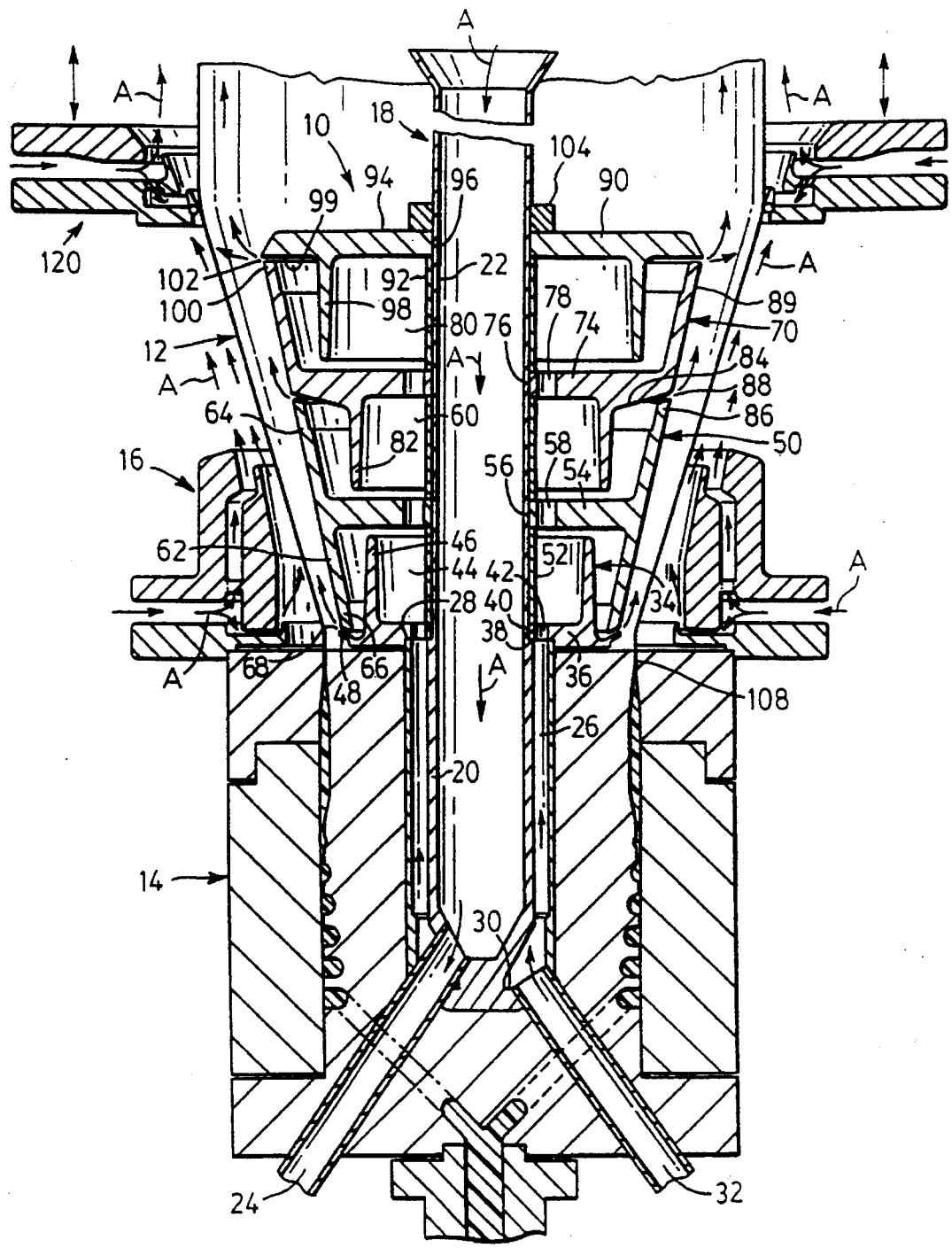

INTERNAL COOLING AIR SUPPLY ASSEMBLY

BACKGROUND OF THE INVENTION

This invention relates to internal cooling air supply assemblies for supplying air to the interior of an extruded plastic film after the film has been extruded from an annular die at an elevated temperature.

Many different types of internal cooling air assemblies for tubular plastic films are known, but there is still a need for an improved internal cooling air assembly which more satisfactorily cools the interior of the tubular film and which is aim mechanically simple and easy to install and remove.

It is therefore an object of the present invention to provide such an improved internal cooling air assembly.

SUMMARY OF THE INVENTION

According to the present invention, an internal cooling supply air assembly comprises a lower annular member mountable on an annular die so as to be within extruded tubular plastic film as the film leaves the die, the die having an air supply passage to supply cooling air to the interior of the lower annular member and an air removal passage including an air removal chimney extending upwardly from the die through the lower annular member to remove air from the interior of the tubular plastic film. An intermediate annular member is positionable above the lower annular member with the air removal chimney extending upwardly therethrough, the intermediate annular member forming a first chamber with the lower annular member and having an annular lower edge spaced from and co-operating with an annular upper edge of the lower annular member to form a first cooling air outlet from the first chamber, the intermediate annular member having a transfer passage for transferring cooling air from the first chamber to the interior of the intermediate annular member. A first upper annular member is positionable above the intermediate annular member with the air removal chimney extending upwardly therethrough, the upper annular member forming a second chamber with intermediate annular member and having an annular lower edge spaced from and co-operating with an upper annular edge of the intermediate annular member to form a second cooling air outlet from the second chamber. The lower, intermediate and first upper annular members form an upward and outwardly inclined sidewall through which the first and second cooling air outlets pass, the sidewall substantially conforming in shape with and extending relatively close to the interior of extruded plastic as the film leaves the die, whereby in use cooling air is directed onto the interior of the film from the first and second chambers through the first and second cooling air outlets respectively, the cooling air outlets being sized to cause cooling air to be directed onto the interior of the film at a greater rate from the second cooling air outlet than from the first cooling air outlet.

A first annular spacer may be slidable over the air removal chimney for positioning between the lower and intermediate annular members to correctly position the intermediate annular member relative to the lower annular member, and a second annular spacer may be slidable over the air removal chimney for positioning between the intermediate and first upper annular members to correctly position the first upper annular member relative to the intermediate annular member.

A further upper annular member may be positionable above the first upper annular member with the air removal chimney extending upwardly therethrough, the further upper annular member forming a third chamber with the first upper annular member arid having an annular lower edge spaced from and co-operating with the upper annular edge of the first upper annular member to form a third cooling air outlet from the third chamber, the first upper annular member having a transfer passage for transferring cooling air from the second chamber to the third chamber, with the third cooling air outlet being sized to cause cooling air to be directed onto the interior of the film at a greater rate from the third air outlet than from the second air outlet.

A third annular spacer may be slidable on the air removal chimney for positioning between the first upper annular member and the further upper annular member to correctly position the further upper annular member relative to the first upper annular member.

A clamping member may be slidable on the air removal chimney and clampable thereto in engagement with the uppermost annular member to retain the annular members in position.

BRIEF DESCRIPTION OF THE DRAWINGS

One embodiment of the invention will now be described, by way of example, with reference to the accompanying drawing, which shows a cross-sectional view of art internal cooling air assembly in accordance with the invention mounted on an annular die.

DESCRIPTION OF THE PREFERRED EMBODIMENT

Referring to the drawing, an internal cooling air assembly 10 in accordance with the invention is provided for supplying cooling air to the interior of an extruded tubular plastic film 12 after the film 12 has been extruded from an annular die 14 at an elevated temperature. Cooling air is supplied to the exterior of the film 12 by a lower external air ring assembly 16 secured to the die 14 so as to surround the film 12. The actual construction of the external air ring assembly 16 is not a feature of the present invention and any suitable air ring assembly may be used. A suitable air ring assembly is described in my co-pending application Ser. No. 08/289,036 filed Aug. 11, 1994, now U.S. Pat. No. 5,464,336 issued Nov. 7, 1995, the contents of which are hereby incorporated herein by reference. The upper portion (not shown) of the tubular film 12 is then passed between the nip of a pair of rollers (not shown) so that a film bubble is formed between the die 14 and the nip of the rollers as is well known to a person skilled in the art.

The die 14 has an air removal chimney 18 with a lower portion 20 within the die 14 and an upper portion 22 extending upwardly therefrom within the tubular plastic film 12. An air removal conduit 24 extends from the lower portion 20 of the chimney 18 through the die 14 to the exterior thereof. The die 14 has an air supply sleeve 26 surrounding the chimney 18 in spaced relation thereto, the air supply sleeve 26 having an upper end 28 communicating with the internal cooling air supply assembly 10 (as will be described in more detail later) and a lower end 30 communicating with an air supply conduit 32 which extends to the exterior of the die 14 for connection to an external source of cooling air (not shown).

The internal cooling air supply assembly 10 has a lower annular member 34 slidably mounted over the upper portion 22 of the chimney 18, the lower annular member 34 having an annular central portion 36 seated on the upper end 28 of the air supply sleeve 20 and on an external shoulder 38 of the air removal chimney 18 at the junction of the lower portion 20 and the upper portion 22 thereof adjacent the die 14. The central portion 36 of the lower annular member 34 has a central aperture 40 through which the upper portion 22 of the chimney 18 passes. The central portion 36 also has a circular array of air supply apertures 42 surrounding the central aperture 40 and communicating with the interior of the air supply sleeve 26 so as to transfer cooling air from the air supply sleeve 26 to a chamber 44 above the central portion 36 of the lower annular member 34.

The lower annular member 34 also has an annular upwardly projecting wall 46 extending upwardly from the outer periphery of the central portion 36 and extending around the air supply apertures 42 at a distance therefrom, and a circumferential lip 48 radially outwardly of the annular wall 46 and extending at an upwardly and outwardly inclined angle.

The internal cooling assembly 10 also has an intermediate annular member 50 slidably mounted on the upper portion 22 of the chimney 18 above the lower annular member 34. A spacer sleeve 52 slidably mounted over the upper portion 22 of the chimney 18 is located between the intermediate annular member 50 and the lower annular member 34 to maintain a desired vertical spacing between. The intermediate annular member 50 has an annular central portion 54 with a central aperture 56 through which the upper portion 22 of the chimney passes, and a circular array of air supply apertures 58 surrounds the central aperture 56 for transferring cooling air from the chamber 44 to a further chamber 60 above the central portion 54 of the intermediate annular member 50.

The intermediate annular member 50 has a downwardly and inwardly inclined circumferential outer wall 62 extending from the periphery of the central portion 54, and an upwardly and outwardly inclined circumferential outer wall 64 also extending from the periphery of the central portion 54. The lower annular end 66 of the wall 62 is close to but spaced from the circumferential lip 48 of the lower annular member 34 to define an annular air supply outlet 68 which extends in an upwardly and outwardly inclined direction.

The cooling air assembly 10 also has a first upper annular member 70 slidably mounted on the upper portion 22 of the chimney 18 above the intermediate annular member 50. A spacer sleeve 72 slidably mounted on the upper portion 22 of the chimney 18 is located between the first upper annular member 70 and the intermediate annular member 50 to maintain a desired vertical spacing therebetween. The first upper annular member 70 has an annular central portion 74 with a central aperture 76 through which the upper portion 22 of the chimney 18 passes, and a circular array of air supply apertures 78 surrounding the central aperture 76 for transferring cooling air from the chamber 60 to a further chamber 80 above the central portion 74 of the first upper annular member 70.

The first upper annular member 70 also has an annular downwardly projecting wall 82 extending downwardly from the central portion 74 at a distance from the air supply apertures 78. The central portion 74 also has a lower annular surface 84 radially outwardly of the downwardly projecting wall 82 which extends in an upwardly and outwardly inclined direction and is close to but spaced from the upper end 86 of the outer wall 64 of the intermediate annular member 50 to define a further air supply outlet 88 which extends in an upwardly and outwardly inclined direction. The first upper annular member 70 also has an upwardly and outwardly inclined circumferential outer wall 89 which extends from the periphery of the central portion 74.

The cooling air assembly 10 further has a second upper annular member 90 slidably mounted on the upper portion 22 of the chimney 18 above the first upper annular member 70. A spacer sleeve 92 slidably mounted on the upper portion of the chimney 18 is located between the second upper annular member 90 and the first upper annular member 70 to maintain a desired vertical spaced relationship therebetween. The second upper annular member 90 has an annular central portion 94 with a central aperture 96 through which the upper portion 22 of the chimney 18 passes. The central portion 94 has an annular downwardly projecting wall 98 extending downwardly from the central portion 94 at a distance from the central aperture 96. The central/portion 94 also has a lower annular surface 99 outwardly of the downwardly projecting wall 98 which extends horizontally and is close to but spaced from the upper end 100 of the outer wall 89 of the first upper annular member 70 to define an annular air supply outlet 102 which extends outwardly in a horizontal manner.

The various components of the internal cooling air assembly 10 described above, namely the lower annular member 34, the intermediate annular member 50, the first upper annular member 70 and the second upper annular member 90, are slidably mounted on the upper portion 22 of the chimney 18, with the lower annular member 34 engaging the upper end 28 of the air supply sleeve 26 and the shoulder 38 at the junction of the upper and lower portions 22,20 of the air removal chimney 18. These components are retained in assembly by a damping collar 104 surrounding the upper portion 22 of the chimney 18 and clamped thereto by a damping bolt (not shown), the damping collar 104 being in engagement with the top of the uppermost annular member 90.

It will be noted that the circumferential walls 62, 64 and 89 of the intermediate and first upper annular members 50,70 provide the internal cooling air assembly 10 with an upwardly and outwardly inclined peripheral sidewall, i.e. the cooling assembly 10 has an inverted frusto-conical cross-section. It will also be noted that the annular air supply outlets 68, 88 are directed at acute angles to the longitudinal axis of the film bubble 12 and that the annular air supply outlet 102 is perpendicular thereto.

The die 14 has an annular orifice 108, the nature of which is well known to a person skilled in the art, from which the tubular plastic film 12 is extruded. The cooling air assembly 10 is located within the tubular plastic film 12 and the external air ring assembly 16 is located on the outside of the tubular plastic film 12. Above the internal cooling air supply assembly 10, the film 12 passes between a pair of nip rollers (not shown) such that air is trapped within the film 12 between the nip rollers and die 14 to form a film bubble, as is well known in the art.

Cooling air may also be supplied to the exterior of the film 112 by a vertically movable upper external air ring assembly 120. The actual construction of the external air ring assembly is not a feature of the present invention and may be any suitable air ring assembly as is the case with the lower air ring assembly 16.

In use, as the tubular plastic film 12 is being extruded from the die 14 through the annular orifice 108, cooling air is supplied through the air supply conduit 32 and air supply sleeve 26 to the internal cooling air assembly 10. Cooling air from the upper end of the air supply sleeve 26 passes through the air supply apertures 42 in the central portion 36 of the lower annular member 34 into the chamber 44. From the chamber 44, some of the cooling air passes around the upper end of the wall 46 and then passes downwardly to flow through the annular cooling air outlet 68 so as to contact and cool the hot molten tubular plastic film 12 as the film 12 emerges from the annular orifice 108. The cooling air outlet 68 is relatively small so that a relatively small amount of cooling air is supplied to the still molten and hence relatively weak lowermost portion of the film bubble.

Other cooling air in chamber 44 passes upwardly through the air supply apertures 58 in the central portion 54 of intermediate annular member 50 into chamber 60. Some of the cooling air in chamber 60 passes downwardly around the end of the downwardly extending wall 82 to pass through the annular cooling air outlet 88 so as to contact and cool a higher and less molten portion of the film 12. The air supply outlet 88 is larger than the air supply outlet 68 so that more cooling air is supplied to the higher and stronger portion of the film 12 than to the lower portion thereof.

Other cooling air in chamber 60 passes upwardly through the air supply apertures 78 in the central portion 74 of the first upper annular member 70 into the chamber 80. Air in the chamber 80 passes around the end of downward extending wall 98 to pass through the cooling air outlet 102 so as to contact and cool a still higher portion of the film 12. The air supply outlet 102 is larger than air supply outlet 88 so that more air is supplied to the still harder and more stronger portion of the film 12 than to the portion of the film 12 therebelow. It will be noted that the annular walls 46, 82, 98 are of progressively increasing diameter such that the chambers 44, 60, 80 are of progressively increasing volume consistent with the diverging nature of the external walls 62, 64, 89.

The cooling air outlets 68, 88, 102 are directed towards the film 12 at angles to the film 12 which are most beneficial to film cooling at the level of the outlet concerned.

After leaving the internal cooling air assembly 10 and cooling the interior of the film 12 as described above, air is removed from the interior of the film bubble through the air removal chimney 18 and air removal conduit 24. Cooling air will also be supplied to the exterior of the film 12 by the lower air ring assembly to and the upper air ring assembly 120. Arrows A show the resulting internal and external air flow over the film 12.

The advantages of the invention will be apparent from the foregoing description of the preferred embodiment. The amount of internal cooling air supplied can be optimized at various heights above the die. Also, the internal cooling air assembly 10 is easily removed for cleaning purposes and if necessary can be replaced by another of a different size.

Other embodiments of the invention will also be readily apparent to a person skilled in the art, the scope of the invention being defined in the appended claims.

I claim:

1. An internal cooling air supply assembly for supplying cooling air to the interior of an extruded tubular plastic film after the film has been extruded from an annular die at an elevated temperature, said air supply assembly comprising:

a lower annular member mountable on an annular die so as to be within extruded tubular plastic film as the film leaves the die, said die having an air supply passage to supply cooling air to the interior of the lower annular member and an air removal passage including an air removal chimney extending upwardly from the die through the lower annular member to remove air from the interior of the tubular plastic film, an intermediate annular member positionable above the lower annular member with the air removal chimney extending upwardly therethrough, said intermediate annular member forming a first chamber with the lower annular member and having an annular lower edge spaced from and co-operating with an annular upper edge of the lower annular member to form a first cooling air outlet from said first chamber, said intermediate annular member having a transfer passage for transferring cooling air from the first chamber to the interior of the intermediate annular member, and a first upper annular member positionable above the intermediate annular member with the air removal chimney extending upwardly therethrough, said upper annular member forming a second chamber with the intermediate annular member and having an annular lower edge spaced from and co-operating with an upper annular edge of the intermediate annular member to form a second cooling air outlet from the second chamber, said lower, intermediate and first upper annular members forming an upwardly and outwardly inclined sidewall through which the first and second cooling air outlets pass, said sidewall substantially conforming in shape with and extending relatively close to the interior of the extruded plastic film as the film leaves the die, whereby in use cooling air is directed onto the interior of the film from the first and second chambers through the first and second cooling air outlets respectively, said cooling air outlets being sized to cause cooling air to be directed onto the interior of the film at a greater rate from the second cooling air outlet than from the first cooling air outlet.

2. An air supply assembly according to claim 1 also including a first annular spacer slidable over the air removal chimney for positioning between the lower and intermediate annular members to correctly position the intermediate annular member relative to the lower annular member, and a second annular spacer slidable over the air removal chimney for positioning between the first upper and intermediate annular members to correctly position the first upper annular member relative to the intermediate annular member.

3. An air supply assembly according to claim 1 also including a further upper annular member positionable above the first upper annular member with the air removal chimney extending upwardly therethrough, said further upper annular member forming a third chamber with the first upper annular member and having an annular lower edge spaced from and co-operating with an upper annular edge of the first upper annular member to form a third cooling air outlet from the third chamber, said first upper annular member having a transfer passage for transferring cooling air from the interior of the intermediate annular member to the interior of the first upper annular member, said third cooling air outlet being sized to cause cooling air to be directed onto the interior of the film at a greater rate from the third cooling air outlet than from the second cooling air outlet.

4. A cooling air assembly according to claim 3 also including a third annular spacer slidable over the air removal chimney for positioning between the first upper annular member and the further upper annular member to correctly position the further upper annular member relative to the first upper annular member.

5. A cooling air assembly according to claim 1 also including a damping member slidable over the air removal chimney and dampable thereto in engagement with the uppermost annular member to retain the annular members in position.

* * * * *